United States Patent
Galtier et al.

[11] Patent Number: 5,856,865
[45] Date of Patent: Jan. 5, 1999

[54] OPTICAL VELOCIMETER PROBE

[75] Inventors: Frédéric Galtier, Montpellier; Olivier Besson, Toulouse, both of France

[73] Assignee: Sextant Avionique, Velizy Villacoublay, France

[21] Appl. No.: 876,235

[22] Filed: Jun. 16, 1997

[30] Foreign Application Priority Data

Jun. 18, 1996 [FR] France ................................ 96 07535

[51] Int. Cl.[6] ............................ G01P 03/36; G01R 23/00
[52] U.S. Cl. ....................................... 356/28.5; 324/76.19
[58] Field of Search ................ 356/28, 28.5; 324/76.24, 324/76.19

[56] References Cited

U.S. PATENT DOCUMENTS

| | | |
|---|---|---|
| 4,786,168 | 11/1988 | Meyers et al. . |
| 4,984,188 | 1/1991 | Kato . |
| 5,005,144 | 4/1991 | Nakajima et al. ...................... 364/565 |
| 5,313,263 | 5/1994 | Abbiss et al. . |
| 5,526,109 | 6/1996 | Johnson ................................ 356/28.5 |
| 5,608,522 | 3/1997 | Breda ...................................... 356/345 |

FOREIGN PATENT DOCUMENTS 0 638 869  2/1995  European Pat. Off. .

OTHER PUBLICATIONS

Yutaka Fukuoka, et al., "Application of Learning Signal Processing System on RBC Velocity Measurement Using Laser Doppler Technique", Proceeding of the Annual Conference of the Engineering in Medicine and Biology Society, vol. 12, No. 3, Nov. 1, 1990, pp. 1410–1412.

*Primary Examiner*—Mark Hellner
*Attorney, Agent, or Firm*—Oblon, Spivak, McClelland, Maier & Neustadt, P.C.

[57] ABSTRACT

An optical velocimetrical probe comprises means to illuminate a volume of measurement in which particles may pass, and optical detection means to produce an electrical signal x(t) in response to the passage of a particle in the illuminated volume. It also comprises means to extract information representing the velocity v of particles from the electrical signal, these means comprising, in particular, means to compute the density of probability $p(x,\theta)$ of the signal vector x(t), means to determine a frequency representing the velocity v for which this probability is the maximum.

9 Claims, 2 Drawing Sheets

OPTICAL VELOCIMETER PROBE

BACKGROUND OF THE INVENTION

1. Field of the Invention

The field of the invention is that of optical velocimeter probes used to define the velocity of particles in relative motion with respect to the probe.

2. Description of the Prior Art

At present, there are optical devices with two laser beams that interfere with each other so as to generate an ellipsoidal volume of measurement consisting of equidistant dark and luminous fringes. When a particle in motion goes through this volume of measurement, the signal collected by a photodetector includes indications on the velocity of this particle with respect to the optical probe. It is therefore possible, by analyzing the signal collected, to define the velocity of a particle considered.

This type of probe can be used to define the velocity of any particle that is small enough in relation to the interference fringes created and especially to define the speed of an aircraft, where the relative velocity of particles in the air in relation to said aircraft equipped with this type of velocimeter probe is known.

Indeed, with advances in terms of the miniaturization and cost of laser sources and especially laser diodes, it is becoming possible to make optical velocimeter probes of this kind, set up on board aircraft whose speed is to be measured.

The performance characteristics of this type of probe directly depend on the means of analysis of the signal collected by a photodetector for the extraction therefrom of the velocity parameter. This is why an object of the invention is an optical velocimeter probe of the type described here above, comprising highly efficient means of determining velocity.

SUMMARY OF THE INVENTION

More specifically, an object of the invention is an optical velocimeter probe comprising means to illuminate a volume of measurement in which there may pass particles in relative motion with respect to the probe, and means of optical detection to produce an electrical signal in response to the passage of a particle in the illuminated volume of measurement, the frequency spectrum of this signal having a width $\Delta F$ centered on a dominant frequency Fo representing the relative velocity of the particle with respect to the probe, with Fo=v/i, i being the interfringe. This probe comprises digital means to set up a vector x(t) representing N digital samples of the electrical signal detected, wherein said probe further comprises:

means to compute the density of probability $p(x,\theta)$ of the signal vector x, constituted by the signal samples $\{x(t)\}_{t=0,\pm 1, \ldots \pm D}$, as a function of a parameter vector $\theta=[A,f_d,\sigma^2]$ completely characterizing x;

means to determine the frequency $f_o$ for which the probability is the maximum;

means to provide an indication of velocity v of a particle with respect to the probe, on the basis of the frequency $f_o$.

The signal vector $x=\{x(t)\}_{t=0,\pm 1, \ldots \pm D}$ is defined by:

$$x(t)=A \cdot e^{-2\alpha^2 f^2 t^2} \cos(2\pi f t)+\omega(t)$$

where $\alpha$ is a fixed coefficient, t denotes time, $\omega(t)$ is a Gaussian noise with an energy value $\sigma^2$.

The vector $\theta$ for its part is defined as:

$$\theta=[A,f_d,\sigma^2].$$

The means used in the invention to determine the frequency f make it possible to achieve a degree of precision, on said frequency, greater than that obtained by a standard method of computation using the Fourier transform. Indeed, since the signal collected at the photodiode is a signal of a determined duration, the frequency spectrum obtained by this means of analysis has a certain spectral width in frequency leading to lack of precision with respect to the determining of said frequency.

BRIEF DESCRIPTION OF THE DRAWINGS

The invention will be understood more clearly and other advantages shall appear from the following non-restrictive description made with reference to the appended figures, of which.

MORE DETAILED DESCRIPTION

In general, the optical velocimeter probe of the invention has two optical beams interfering in a volume of measurement.

Figure 1:
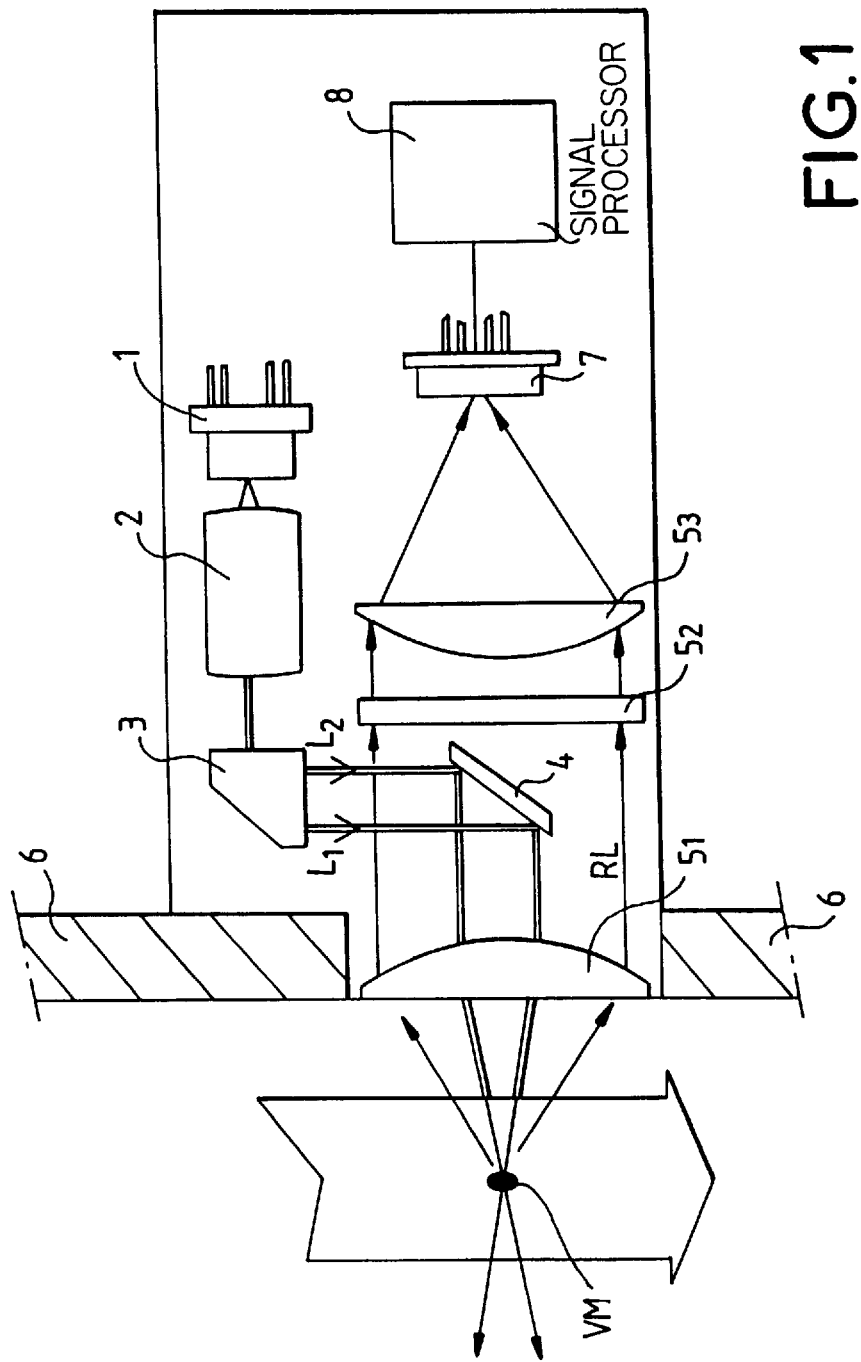
FIG. 1 illustrates an exemplary velocimeter probe according to the invention.

FIG. 1 illustrates an exemplary embodiment of a velocimeter probe mounted on board an aircraft, comprising a laser source 1, which may be a laser diode type of source, at output of which there is a collimator 2, an optical beam divider 3 creating two parallel optical beams L1 and L2 directed by means of a bending reflection system 4 towards an optical system 51 to the exterior of the aircraft represented by the skin of the aircraft 6. The optical system 51 has the function of making the light beams L1 and L2 converge in an external volume called a volume of measurement MV, contained in the atmosphere in which there flow the constituent particles of atmospheric aerosols. These aerosols send back the back-scattered light in the form of a light beam RL detected by the photodetector 7 which may typically be a photodiode, through optical systems 51, 52, 53.

At output of the photodiode, the velocimeter probe comprises means for the processing of the signal 8 comprising means for the conversion of the analog signal into a digital signal, means for the extraction of information on frequency and means to compute the relative velocity of the particles with respect to the aircraft.

Figure 2:
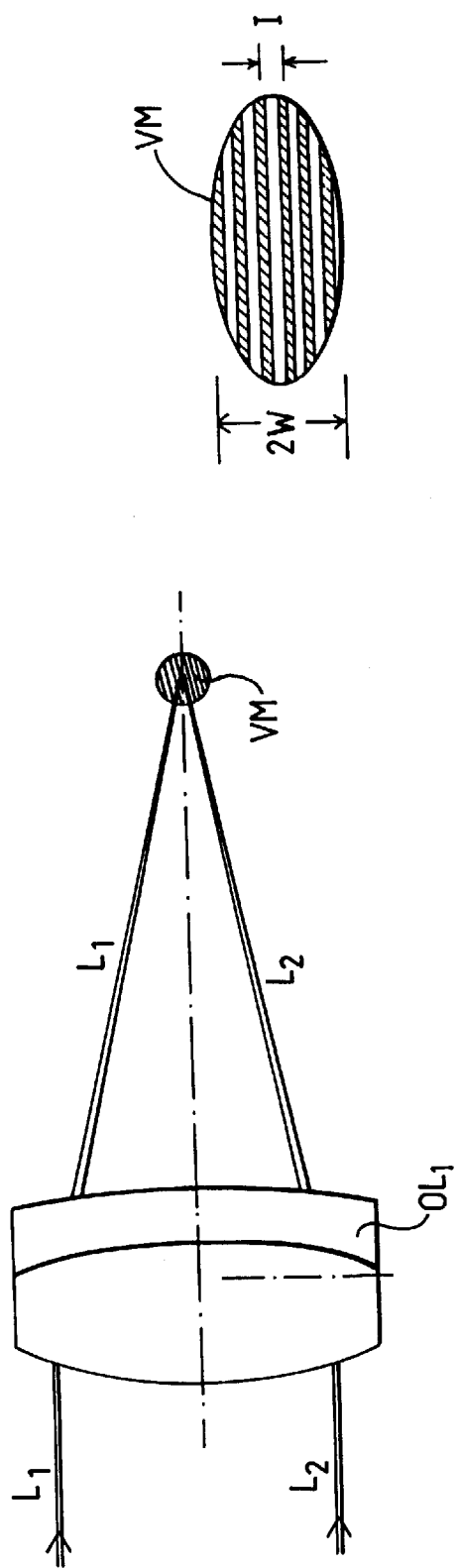
FIG. 2 represents the volume of measurement in which there pass the particles whose relative velocity is to be detected.

FIG. 2 gives a schematic view of the volume of measurement VM constituted by the interference fringes of the two optical beams L1 and L2. The width 2W represents the total width of this volume, I being the interfringe width.

The probe according to the invention comprises means 8 for the processing of the signal collected at the photodetector 7, used for the high-precision definition of the velocity of a particle going through the volume of measurement VM.

The means 8 shall be described by recalling first of all the following considerations:

When a particle having a relative velocity v with respect to the volume of measurement VM penetrates this system of interfringes, the light back-scattered by this particle and collected by the photodetector 5 gives a signal i(t) whose mathematical model is known:

$$i(t)=A.s(t)=A.e^{-2(v/w)^2 t^2} \cos(2\pi v/I.t)+\omega(t)$$

with $t=0,\pm1, \ldots \pm w/v$
where
  the amplitude A depends on the size of the particle, the incident light power and the coefficient of transmission of the receiver part;
  v represents the velocity of the particle;
  2w represents the total width of the interference fringes defining the volume of measurement as illustrated by FIG. 2;
  I represents the interfringe width;
  $\omega(t)$ is a white noise assumed to be Gaussian with an energy value $\sigma^2$
with $\alpha=I/w$ and $f_d=v/I$
we obtain $$i(t)=A.s(t)+\omega(t)=A.e^{-2\alpha^2 f_d^2 t^2} \cos(2\pi f_d t)+\omega(t)$$

the probe according to the invention comprises means to take N samples of the signal at instants $t=-D, \ldots, 0, \ldots, +D$; all these samples are used to define the vector x such that: $x=A.s+\omega$;

it also includes means to define a maximum likelihood estimator, used to obtain an estimate fo that gives the greatest possible likelihood for the measurements performed on the signal and the values obtained from the theoretical model for the frequency $f_o$;

to define this probability function, it is possible to determine a vector $\theta$ (pertaining to the mathematical model) depending on the parameters $(A, f, \omega)$. The noise $\omega(t)$ may be estimated to be equal to a mean value $\sigma^2$. $\theta$ then depends only on the parameters $(A, f)$. The function of density of probability $p(x,\theta)$ may then be defined as follows. The vector s contains the theoretical data elements corresponding to $\theta$ while x contains the data elements measured.

$$p(x_1\theta) = \frac{1}{(2\pi\sigma^2)^{(2D+1)/2}} \cdot \exp \cdot \left\{ \frac{-1}{2\sigma^2} \|x-As\|^2 \right\} \quad (1)$$

Seeking to maximize the function $p(x,\theta)$ is equivalent to seeking to maximize the logarithm of $p(x,\theta)$, namely the function $\Lambda(x,\theta)$ with:

$$\Lambda(x_1\theta) = -\left(\frac{2D+1}{2}\right)\log 2\pi - \left(\frac{2D+1}{2}\right)\log\sigma^2 - \frac{1}{2\sigma^2}\|x-As\|^2 \quad (2)$$

In defining an estimate $\hat{A}$ of the parameter A with $$\hat{A} = \frac{s^T \cdot x}{s^T \cdot s}$$

$s^T$ being the transpose value of S.
The equation (2) becomes the following equation (3):

$$\Lambda(x_1\theta) = -\left(\frac{2D+1}{2}\right)\log 2\pi - \left(\frac{2D+1}{2}\right)\log\sigma^2 - \frac{1}{2\sigma^2}\left\|x - \frac{s^T \cdot x}{s^T \cdot s} \cdot s\right\|^2 \quad (3)$$

We are thus led to seek the minimum of the function $$J(f)\left\|x - \frac{s^T \cdot x}{s^T \cdot s} \cdot s\right\|^2$$

with $x=[x(-D), \ldots, x(o) \ldots, x(D)]^T$
$s=[s(-D), \ldots, s(o), \ldots, s(D)]^T$
and $s(t)=e^{-2\alpha^2 f^2 t^2} \cdot \cos(2\pi ft)$ Since the function J(f) is a non-linear function of f, there is no analytical solution to determine the value $f_o$ for which this function J(f) is the minimum, namely a function possessing a zero first derivative J'(f) and a positive second derivative J''(f).

One approach proposed in the context of the probe according to the invention is to proceed by iteration from a first value $f_{o1}$ defined by Fourier transform of the signal collected at the photodetector.

Several types of iteration may be used to converge towards the estimated value $f_o$ being sought.

It is possible in particular to use a Gauss-Newton type algorithm in which the increment of estimated frequency is determined by the following equation (4):

$$f^{(n+1)} = f^{(n)} - \left[\frac{1}{J''}J'\right]_{f^{(n)}} \quad J'(f) = \frac{dJ(f)}{df} \text{ and } J''(f) = \frac{d^2J(f)}{d^2f} \quad (4)$$

An estimated value $f_o = f^{(n)}$ is determined when the difference $f^{(n+1)} - f^{(n)}$ is below a predefined threshold in assuming that $$\epsilon = x - \frac{s^T \cdot x}{s^T \cdot s} \cdot s$$

it is possible to write $J(f) = \|\epsilon\|^2$
and we have $$J'(f) = 2\epsilon'^T \cdot \epsilon \text{ if } \epsilon' = \frac{d\epsilon(f)}{df}$$

The Gauss-Newton procedure also relies on the following approximation given by the equation (5):

$$J''(f) = 2\epsilon''^T . \epsilon + 2\epsilon'^T . \epsilon' \cong 2\epsilon'^T \epsilon' \quad (5)$$

It can be shown that:

$$\epsilon' = -\frac{[(x^T \cdot s'f)(s^T \cdot s) - 2(x^T \cdot s)(s^T \cdot s'f)]s + (x^T \cdot s)(s^T \cdot s)s'f}{(s^T \cdot s)^2}$$

with $$s'f = \frac{ds(f)}{df}$$

In the likelihood estimator used in the signal processing means of the velocimeter probe, it is advantageously possible to approximate the different scalar products:

$$s^T \cdot s \simeq \frac{\sqrt{\pi}}{4\alpha \cdot f}$$

$$s^T \cdot s'f \simeq -\frac{\sqrt{\pi}}{8\alpha \cdot f^2}$$

-continued $$s'^T_f \cdot s'_f \simeq \frac{\sqrt{\pi} \ (3\alpha^2 + 2\pi^2)}{16\alpha^3 f^3}$$

in taking the discrete sums on 2T+1 points to be infinite discrete sums and then similarly in taking these infinite discrete sums to be continuous integrals from $+\infty$ to $-\infty$.

In carrying the above-mentioned values into the first and second derivatives J'(f and J"(f), we obtain the following expressions:

$$J'(f) \simeq \frac{4\alpha}{\sqrt{\pi}} \ \{2f(x^T \cdot s'f) + (x^T \cdot s)\}(x^T \cdot s)$$

$$J''(f) = \frac{2}{\sqrt{\pi} \cdot \alpha f} \ \{\alpha^2[2f(x^T \cdot s'f) + (x^T \cdot s)]^2 + 2(\alpha^2 + \pi^2)(x^T \cdot s)\} \text{ The}$$

formula of iteration on the frequency becoming:

$$f^{(n+1)} = f^{(n)} - \left[ (-2\alpha^2 f) \cdot \frac{\{2f \cdot (x^T \cdot s'f) + (x^T \cdot s)\}(x^T \cdot s)}{\{\alpha^2[2f \cdot (x^T \cdot s'f) + (x^T \cdot s)]^2 + 2(\alpha^2 + \pi^2)(x^T \cdot s)^2\}} \right]_{f^{(n)}}$$

Each iteration thus requires the computation of $x^T.s$ and $x^T.s'f$, namely 2(2D+1) operations of multiplication and addition plus seven multiplication operations and two addition operations on the scalar values.

The algorithm used thus comprises the following three phases:
- the initializing of the algorithm with $f_{01}=f_{FFT}(f_{FFT}$: frequency obtained by the Fourier transform),
- updating of the estimated frequency by the iteration formula,
- the stopping of the computation is set by the validation of a criterion of precision on the estimation. This criterion depends on the value of a parameter $\delta$ defined as follows:

$$|f^{(n+1)}-f^{(n)}| \leq \delta f^{(n)}$$

With the type of estimator used in the present invention, it is possible not only to compute the estimate of the frequency desired but also to compute an estimation of the degree of confidence that can be had in the estimation of frequency.

In general, for any estimator that can be constructed on the signal, there is a measurement of efficiency (in terms of precision of the results that it gives) of this estimator constituted by the Cramer-Rao boundaries (corresponding to boundaries associated with a noise model, herein supposed to be a Gaussian white noise).

The Cramer-Rao boundaries (usually written as CRB) constitute, in terms of variance, the ultimate performance of any estimator that could be built on the signal. This is to say that they give the lower limit of the variance of the estimated parameters of the signal with respect to its theoretical model.

The estimation method proposed in the invention, called a maximum likelihood estimator, is the best estimator possible in terms of precision of measurement, attaining the Cramer-Rao boundaries.

Thus it may be considered that, in 99% of cases, the measurement made on f is included in the interval:

$$[f_0 - 2\sqrt{CRB(f_0)} \ ; f_0 + 2\sqrt{CRB(f_0)} \ ]$$

The boundary $CRB(f_o)$ is computed as follows:

On the basis of the equation of probability (2), the FIM (Fisher Information Matrix) is defined. The elements of the FIM are given by the equation:

$$F_{ij} = -E\left\{ \frac{\partial^2 \Lambda(x,\theta)}{\partial \theta_i \partial \theta_j} \right\}$$

with $\theta_i$ is the ith component of the vector $\theta$
and the CRB($\theta$) boundaries are defined by the equation CRB($\theta$)=$F^{-1}$.

it can be shown in particular that CRB($f_o$) meets the following approximation:

$$CRB(f_o) \approx \frac{\sigma^2}{A^2} \ \frac{8\alpha^3 f_d{}^3}{\sqrt{\pi} \ (\alpha^2 + \pi^2)}$$

What is claimed is:

1. An optical velocimeter probe comprising means to illuminate a volume of measurement in which there may pass particles in relative motion with respect to the probe, and means of optical detection to produce an electrical signal in response to the passage of a particle in the illuminated volume of measurement, representing the relative velocity of the particle with respect to the probe, this probe comprising digital means to set up a vector x(t) representing N digital samples of the electrical signal detected wherein said probe further comprises:

means to compute the density of probability p(x,$\theta$) of the signal vector x, constituted by the signal samples $\{x(t)\}_t=0,\pm1, \ldots \pm D$, as a function of a parameter vector $\theta=[A,f_d, \sigma^2]$ completely characterizing x; wherein $\sigma^2$ is the energy value of a white noise assumed to be of a Gaussian distribution for back scattered light produced by said particles, wherein A is an amplitude proportional to the size of the particle, the incident light power and the coefficient transmission of the optical detector means and wherein fd is a relative velocity of the particle with respect to said volume divided by a width of an interfringe produced by said means to illuminate;

means to determine a frequency $f_o$ for which the probability is a maximum;

means to provide an indication of velocity v of the particle with respect to the probe, on the basis of the frequency $f_o$.

2. A velocimeter probe according to claim 1, wherein the signal vector $x=\{x(t)\}_{t=0,\pm1, \ldots \pm D}$ is defined by:

$$x(t)=A.e^{-2\alpha^2 f^2 t^2} \cos (2\pi f t)+\omega(t)$$

where
$\alpha$ is a fixed coefficient,
t denotes time,
$\omega(t)$ is a Gaussian noise with an energy value $\sigma^2$.

3. An optical velocimeter probe according to claim 1, characterized by the following expression of the density of probability of the data elements measured as a function of the parameter vector $\sigma$:

$$\log P(x,\theta)=(2D+1)/2. \log 2\pi-(2D+1)/2. \log \sigma^2 -\tfrac{1}{2}\sigma^2\|x-A.s\|$$

where $s(t) = e^{-2\alpha^2 f^2 t^2} \cos(2\pi f t)$ and where $-D, \ldots, 0, \ldots, +D$ correspond to the points in time when the N samples are taken.

4. An optical velocimeter probe according to one of the claims 1 to 3, wherein the amplitude A is estimated at the value $\hat{A}$ whose value is given by the following formula:

$$\hat{A} = s^T \cdot x / s^T \cdot s$$

where $s^T$ is the transpose of the vector s.

5. An optical velocimeter probe according to claim 4, wherein the possible values f to compute the probability $P(x,\theta)$ are a succession of values $f_n$ where n is an index and the value $f^{(n+1)}$ is deduced from the value $f^{(n)}$ according to a Gauss-Newton type iteration.

6. An optical velocimeter problem according to claim 5, wherein:

$$f^{(n+1)} = f^{(n)} - \left[ \frac{J'}{J''} \right]_{f^{(n)}}$$

with J' et J" being the first and second derivative functions of the first and second functions $J_1(f)$ defined by $J(f) = \|\epsilon\|^2$ with $$\epsilon = x - \frac{s^T \cdot x}{s^T \cdot s} \cdot s.$$

7. A velocimeter probe according to claim 6, wherein J'(f) is computed by the scalar product $2\epsilon'^T \cdot \epsilon$, $\epsilon'^T$ is the transposed value of $\epsilon'$.

8. A velocimeter probe according to claim 7, wherein the secondary derivative J"(f) is computed by the scalar product $2\epsilon'^T \cdot \epsilon$.

9. A velocimeter problem according to claim 7, wherein the scalar products $s^T \cdot s$, $s^T \cdot s'f$, $s'f^T \cdot s'f$ are approximated by the following values:

$$s^T \cdot s \approx \frac{\sqrt{\pi}}{4\alpha \cdot f}, \quad s^T \cdot s'f \approx \frac{-\sqrt{\pi}}{8\alpha f^2}, \quad s'f^T \cdot s'f \approx \frac{\sqrt{\pi}\,(3\alpha^2 + 2\pi^2)}{16 \cdot \alpha^3 f^3}.$$

* * * * *